United States Patent
Applegate-Swanson et al.

(10) Patent No.: US 11,818,175 B2
(45) Date of Patent: Nov. 14, 2023

(54) METHOD AND SYSTEM FOR QUANTIFYING AND IMPROVING CONFORMANCE TO LEAST PRIVILEGE SECURITY POLICIES

(71) Applicant: Microsoft Technology Licensing, LLC, Redmond, WA (US)

(72) Inventors: Shaun Applegate-Swanson, Walnut Creek, CA (US); Carl Waldspurger, Palo Alto, CA (US); Balaji Parimi, Sunnyvale, CA (US); Naveen Jangalapalli, San Jose, CA (US); Maya Neelakandhan, Sunnyvale, CA (US); Venkata Adusumilli, Cupertino, CA (US); Parag Bajaria, Cupertino, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 312 days.

(21) Appl. No.: 17/185,594

(22) Filed: Feb. 25, 2021

(65) Prior Publication Data
US 2021/0281610 A1 Sep. 9, 2021

Related U.S. Application Data

(60) Provisional application No. 62/981,590, filed on Feb. 26, 2020.

(51) Int. Cl.
*H04L 9/40* (2022.01)
*H04L 41/22* (2022.01)

(52) U.S. Cl.
CPC ............ *H04L 63/20* (2013.01); *H04L 41/22* (2013.01); *H04L 63/104* (2013.01); *H04L 63/105* (2013.01)

(58) Field of Classification Search
CPC ....... H04L 63/20; H04L 41/22; H04L 63/104; H04L 63/105; H04L 43/045
(Continued)

(56) References Cited

U.S. PATENT DOCUMENTS

2011/0321175 A1* 12/2011 Slater .................... G06F 21/552
726/28
2017/0295197 A1* 10/2017 Parimi .................... H04L 63/10
(Continued)

FOREIGN PATENT DOCUMENTS

CN 106357739 A * 1/2017 ............ H04L 67/10
CN 110519776 B * 9/2021 ............ H04W 24/02
(Continued)

*Primary Examiner* — Abiy Getachew
*Assistant Examiner* — Aubrey H Wyszynski
(74) *Attorney, Agent, or Firm* — Weaver IP L.L.C.

(57) ABSTRACT

Access privileges of at least one identity to resources are adjusted within an authorization system of a computing environment. Over a detection period, accesses by the identity to the resources are detected and a usage score is computed as a usage function of a measure of use by the identity of access privilege(s) it has been granted to at least one of the resources relative to a measure of a set of possible grantable privileges. In accordance with a least privilege security policy, and according to the usage score, the set of access privileges granted to the identity may then be adjusted.

32 Claims, 1 Drawing Sheet

(58) Field of Classification Search
USPC .............................................................. 726/1
See application file for complete search history.

(56) References Cited

U.S. PATENT DOCUMENTS

| | | | |
|---|---|---|---|
| 2020/0204558 A1* | 6/2020 | Kurmi | ..................... H04L 63/20 |
| 2020/0320208 A1* | 10/2020 | Bhosale | ................... G06N 3/08 |
| 2021/0234877 A1* | 7/2021 | Prabhu | .................. H04L 63/102 |

FOREIGN PATENT DOCUMENTS

| | | | | |
|---|---|---|---|---|
| CN | 108345501 B | * | 10/2021 | ........... G06F 9/4818 |
| KR | 20100081341 A | * | 10/2010 | ........... G06F 9/5066 |

* cited by examiner

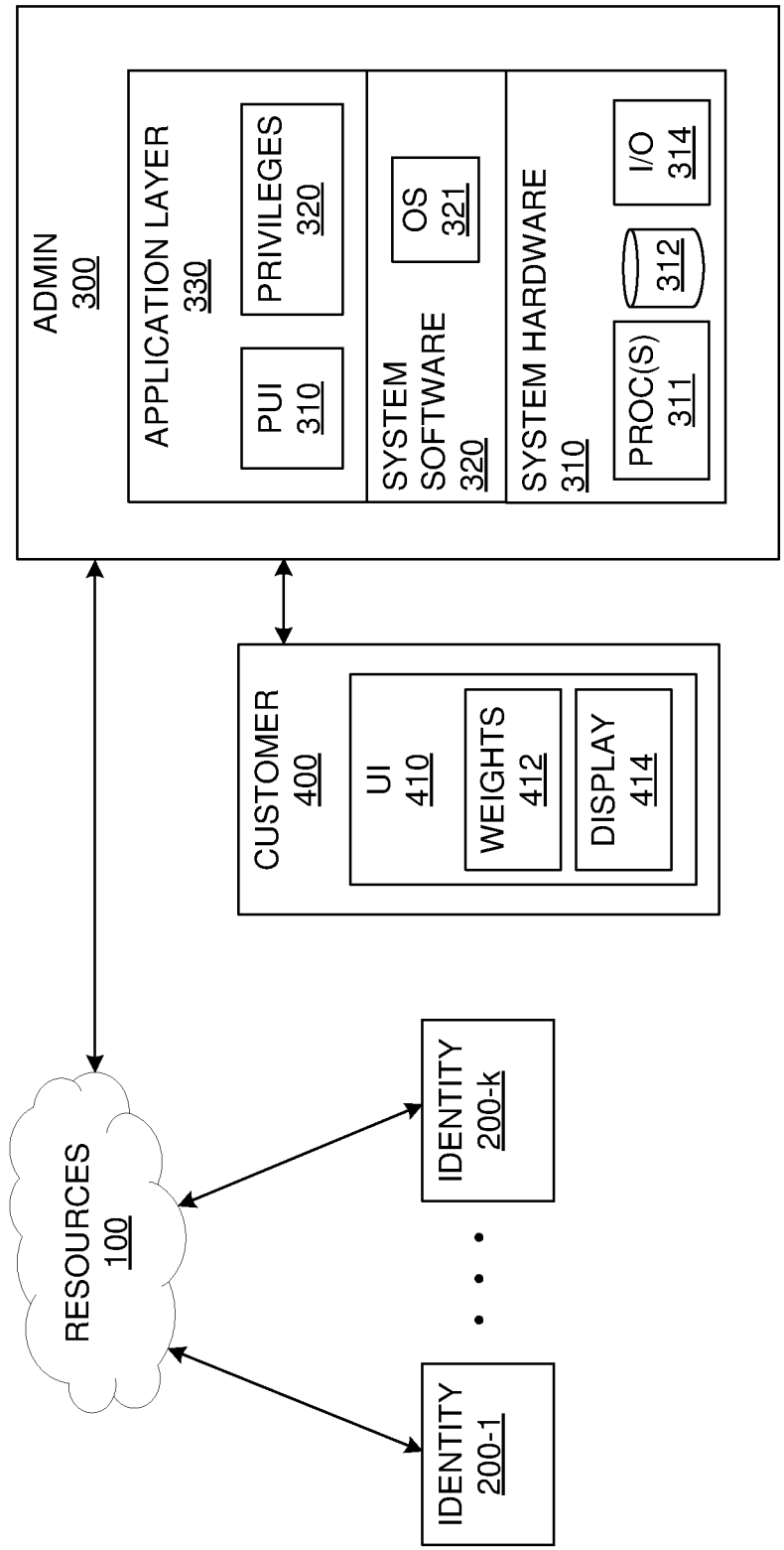

METHOD AND SYSTEM FOR QUANTIFYING AND IMPROVING CONFORMANCE TO LEAST PRIVILEGE SECURITY POLICIES

CROSS-REFERENCE TO RELATED APPLICATIONS

This application claims priority of U.S. Provisional Patent Application No. 62/981,590, filed 26 Feb. 2020.

TECHNICAL FIELD

This invention relates to computer security in general and to resource access control in particular.

BACKGROUND

The Principle of Least Privilege (POLP) is an important concept in computer security and states that identities (such as humans, "bots", groups, programs, and processes) should be granted only the bare minimum privileges that are necessary to perform their intended function. Normally, the privileges needed to perform intended tasks may change over time, or may be context-dependent. This principle is also referred to as the Principle of Minimal Privilege (POMP), or the Principle of Least Authority (POLA). Adhering to this principle reduces the risk of attackers gaining access to critical systems or sensitive data by compromising accounts that are over-privileged.

For example, a program deployed to perform daily backups does not need the ability to install new software. If the program is given the right to install software, an attacker who is able to compromise the backup program would be able to install malware and gain access to more critical systems. As another example, an employee hired to enter data into a database needs the ability to add records to that database, but not the ability to delete records, nor to perform arbitrary queries. Similarly, privileges should be granted narrowly in order to provide access only to the information and resources that are required to perform a legitimate task. For example, an engineering process that builds software needs to read relevant source-code files, but should not be given more expansive access that allows it to read sensitive financial files or to access personal data stored in a human-resources database.

Unfortunately, in practice, it is difficult to determine whether or not security policies are actually conforming to POLP. One challenge is that modern computer system deployments are often extremely complex. Organizations commonly rely on multiple cloud service providers and distributed networks that contain many physical and virtual machines running diverse software. Such systems are typically accessed by many identities performing a variety of actions at different times, from various locations. Security policies that assign privileges to identities are similarly complex and difficult to understand, especially when they are based in part on the use of multiple roles or membership in groups.

In practice, some entities may use all of the privileges they are granted—indicating that they are indeed required, fully adhering to POLP. In contrast, other identities may use only a small subset of the privileges they have been granted, which may indicate that they have far more privileges than necessary, violating POLP significantly. While it is possible for administrators to monitor the use of granted privileges, this is currently a labor-intensive, manual process. As a result of the complexity and highly dynamic nature of both computing environments and the manually-crafted security policies used to assign privileges to identities within those environments, it is often too difficult for administrators to understand and adequately assess how well the policies that they have specified conform to the Principle of Least Privilege (POLP).

What is needed is a way to determine conformance with POLP security policies that allows for a clear presentation of security policy adherence, at the granularity of individual entities or even groups of entities, or both, and preferably (optionally) also such that grants of privileges may be adjusted, either manually or automatically, to improve POLP adherence.

BRIEF DESCRIPTION OF THE DRAWINGS

FIG. 1 illustrates the main entities and system components used to determine, quantify, and process metrics of privilege use.

DESCRIPTION

Embodiments implement various metrics of privilege use and may find particular use in, among other environments, data centers, in devices for networking, storage, and firewalls, in SaaS ("Software as a Service") applications, etc. These may include metrics indicating how well the privileges associated with an individual entity adheres to POLP at a given time, as well as metrics indicating how well a collection of multiple entities or an entire organization conforms to POLP in aggregate. In some embodiments, the metrics may be compared across individual entities, and aggregate metrics may be compared across different organizations. One use of these metrics may be for reporting to administrators, who may use them to make informed decisions about how to improve security by modifying existing policies to better conform to POLP; alternatively, or at the same time, the metrics may be applied to a routine that automatically adjusts privileges to meet some pre-set, availability-dependent, time-dependent, or other type of requirements, or other system changes such as an increase or decrease in availability of resources.

For convenience, the term "identity" (k of which are illustrated in FIG. 1 as 200-1, . . . , 200-k) refers here to any resource-accessing entity (or, in the plural, group of entities). Examples of identities include a human user in control of a computer, a process within a single computer system, or the computer system viewed as a whole, an automated service account (or "bot"), or any other human or automated entity that is able to issue a request to use a computer resource to which access may be limited to those with an associated permission. Resources may be within a single system, under the control of the same operating system and using the same hardware, or may be remote and distributed, such as in different servers in the "cloud", or any combination of these.

Similarly, the administrative entity ("administrator") 300 may be any entity, human or otherwise (such as a bot), that may monitor, manage, or administer an authorization system (in the context of this invention, a system able to establish and enforce resource access policies) via management software or any other user interface. The administrator may also be, or communicate with, the entity that computes the metric(s) described below. The administrator may be a software module within a single computer, or it may be a group of cooperative software modules running on different hosts that collect resource access data of respective identities and compute respective metrics, or communicate this data to a higher-level administrator that computes metric(s) more centrally, or a combination of these options. Depending on the implementation, the administrator may also be a human, and in some cases different administrator functions may be performed automatically and by a human operator in the same implementation.

A "customer" (referenced in FIG. 1 as 400) is any entity that wishes to receive the results of the data collection and processing described below, that is, that wishes to receive the information about risk and conformity to POLP that embodiments generate. A customer may also be an identity, or the administrator, but may also be some other party that wishes to receive the information. Customer 400 is shown in FIG. 1 as being a separate entity only as one example. A customer may therefore use either its own computer system, or share or be using the same computer system as some other entity.

Privileges are granted to identities to perform tasks on resources (referenced in FIG. 1 collectively as 100). In some literature, a distinction is made between the concept of "privilege", which may refer to whether or not a user can use certain features, adjust settings, etc., whereas "permissions" refer to grants of access to specific objects and data. Since embodiments of this invention may be used to generate metrics equally in either situation, this disclosure does not make this distinction; rather, the term "privileges" is used in both senses and is considered to be synonymous with "permissions".

Resources may be of any type, both software and hardware or a combination. Physical hosts, memory and storage, virtual machines (VMs), devices, databases, network devices, services, software licenses, etc., are but a few of the many resources found in a typical computer environment. Tasks include such operations as reading, writing, creating, deleting, inserting, updating, associating and disassociating, moving data, running code, etc., all of which has some effect on or at least involve at least one resource. As used here, an "action" applies a task to a resource.

An authorization system typically provides granular policies for hundreds or thousands of different actions, although this scale is not required by embodiments of this invention. A single policy may also provide privileges to one or more entities, that is, for one or more actions, that is, for one or more tasks to be applied over a subset of (or all) resources.

One metric that embodiments may use is, merely for the sake of convenience, referred to here as a Privilege Use Index (PUI). The PUI is preferably at least one number or "score" that indicates a result in a range such as [r_min, r_max], where r_min is minimal risk or maximal conformance to the POLP policy and r_max is maximal risk or minimal conformance. One example of the range for PUI could be [0, 100]. Without loss of generality, it would also be possible to implement embodiments of this invention with the range definitions "reversed", that is, such that r_min is maximal risk (minimal conformance) and r_max is minimal risk or maximal conformance. This is a matter of choice of definition and system designers will know how to adjust any of the formulas and procedures disclosed below to accommodate their choice.

In some embodiments, the computation of the POLP metric(s) is based on inputs such as the number of privileges to perform actions that have been granted but which have remained "unused" over some time period, the total number of privileges that could be granted in the system, and the resources to which those actions can be applied.

In one embodiment, the PUI is determined as follows:

$$PUI=(U(.),A(.),\text{other}), \text{where}$$

U(.) is a function that returns a metric that indicates how much at least one identity is or has in some sense been using permissions, either in absolute terms, or based on frequency, or relative to other identities or some other system activity, etc., or any combination of these.

A(.) is a function that returns a metric relating to the availability of permissioned resources in the system. In some embodiments, A(.) may not be needed, such that PUI is computed based on only U(.) and other (see below). Furthermore, the PUI expression above shows U(.) and A(.) as separate functions merely for the sake of ease of explanation; in some embodiments, the purposes of U(.) and A(.) may be combined into a single expression.

other may represent any other parameters or functions chosen to cause the PUI to be adjusted according to other desired factors. In particular, one or more sets of weights may be included as other parameters. Examples of both single-factor and multi-factor weights are disclosed below.

U(.)

As mentioned above, U(.) is a function that returns a metric that indicates how much at least one identity is or has in some sense been using (or, conversely, not using) permissions. U(.) thus relates generally to privileges. As one example, U(.) may be a ratio of a measure of actual use and a measure of total possible use, which has the advantage of ensuring that the value of U(.) will fall in a known range (such as a proper fraction in [0, 1] or a percentage in [0, 100]). The concept of "used" (or "unused", depending on how one chooses to define the behavior one wishes to observe and quantify) may be measured as a function of time, such as use over a time period (an "accumulation period" also referred to below as the "detection period"), which may be predetermined and fixed (such as 90 days, 60 seconds, etc.), or relative to some external system or other event that triggers a cut-off, or according to some other schedule, or simply by administrator decision, etc.

In other implementations, the measure of use (or non-use) could be determined not as some "count" of uses, but rather as a function of a measure of time itself, such as the average time between actions that require privileges either over an accumulation period or after some number of actions. Thus, the behavior-related input to U(.) could be "average time between uses over the accumulation period", or "time (or average time) required for a number n actions to occur", etc.

The measure of use may be a simple count, or could be a measure of frequency, or any other chosen quantification. In some implementations, U(.) may also be a real-value weight reflecting frequency of use (such as accesses per time unit), or an amount or proportion of some quantitatively defined privilege (such as a privilege that allows, for example, some number of actions or size of allocation of some resource).

Still another example of how U(.) might be computed would be to compute a weighted sum of a measure of the "recency" of actions. For example, by multiplying the numerical value of each action by the respective value of a function that decays/grows exponentially, linearly, or non-linearly over the aggregation period, and then summing (or averaging) the results, the value of U(.) could be caused to be greater for frequent action nearer the beginning/end of the aggregation period.

Weights may also be chosen to reflect qualitative factors, such as the risk associated with an action, or a privilege level of the identity itself, or both. For example, the weight of a company CEO might be set to a highest value (or lowest, depending on how the metric is defined) whereas the weight for a data input operator might be set at the other extreme. Similarly, an action that has much more serious consequences than others may be given a higher weight. For example, an action that involves access to personal information or deletion of important files or changes of security settings might reasonably be given a higher weight than others.

As yet another example, U(.) might be computed to reflect such statistical usage patterns as the average or standard deviation of the times between consecutive actions, which may indicate the "regularity" of action by an identity. The metric may also be computed for other similarly situated identities, that is, those with similar permission levels. By storing a history of the metric for an identity, or for more than one identity, an administrator may then more easily detect anomalous behavior either in isolation (such as an unexpected "spike" in uses) or in comparison with other identities.

A simple count of actions may be convenient in the cases in which actions are viewed "binarily"—either they are "high risk" or they are not. In other cases, U(.) may itself be computed as the possibly weighted (by, for example, degree of privilege required) sum of counts (or other functions, such as decaying/growing weighting, or according to some other weighting scheme) of different granted actions.

A(.)

As mentioned above, A(.) is a function that measures some aspect of the number of resources in the system. A(.) thus relates generally to resources. As just one example, A(.) might be chosen to be a ratio of the number of permissioned resources in the system and the number of total resources in the system. Such a ratio would give an indication of the degree of "risk exposure" of the system, and may also be used as a basis for normalizing the identity metrics of different systems for the purpose of comparison. By providing a more "overall" measure of permissioned system resources, A(.) may also often be useful in scenarios in which multiple identities compete/contend for limited resources. In some implementations, however, A(.) may not be included at all in the calculation of a PUI.

Other

These parameters will generally depend on the goals of a specific implementation and on what a system administrator wishes to be able to monitor, control, or record. Some examples of such other parameters include:

time—either absolute (such as a "deadlines" or fixed, allotted times) or relative to other activities, or as determined by linear, exponential, or other decay factors allotments—such as an indication of a fixed number of permissions or actions an identity (or group of identities) may exercise, possibly also restricted with respect to time. For example, an identity could be allowed no more than n actions, or may be limited to use for a time T, or a combination of these, such that the n actions must take place within time T. Allotments might also be made a function of a payment model, such that identities in some sense pay for resource access; payment might be monetary, but could also be in terms of such things as CPU cycles or some other "proof-of-stake" cost.

weights—either fixed or adjustable, indicating the relative importance of other factors in the PUI calculation. For example, some identities, risky actions, or critical resources may be weighted more highly than others security—any attempt by an identity to perform an action for which the identity does not have permission may be reflected in a setting—either binary, such as a flag, or numerical, indicating frequency, severity, etc.—for example, that causes the PUI to be set or computed at or near r_max behavior-based—some of the values above, or others chosen by the system designer, may be based on heuristics derived from an identity's system usage pattern other than actual or attempted access to privileged resources administrative—in some implementations, an identity's PUI could also be made dependent on such "non-technical" factors as a payment or subscription status, an access schedule, etc. Especially in implementations in which an identity's ability to access resources at all is determined at least in part by the identity's PUI, such parameters could therefore function as a way for the administrator to control and adjust such access Of course, other factors may be included as other depending on the needs of given implementations, and those mentioned are themselves optional. Moreover, that some parameters such as time, weights, etc., may be described here under the category "other" does not mean that they may not also included as parameters in either or both of the functions U(.) and A(.) as well; in fact, in many cases, parameters such as time, and weights, will be included in the computations of both U(.) and A(.).

The other parameters may be made adjustable, either manually, or automatically, based on heuristics relating to the current identities or on run-time or other statistics or conditions, such as changes to the type or nature of permissioned resources, etc.

EXAMPLE 1

As one embodiment, in generalized form, a PUI may be computed as follows, either for an individual entity or an aggregate of entities in some pre-defined set:

$$PUI = \frac{privilegeUsageAggregator(.)}{privilegeSystemAggregator(.)}$$

where $$privilegeUsageAggregator(.) = \sum_{t \in tasks, rSet \subseteq resources} (privUsage_{t,rSet})$$

Here:

t is a task. The value t may have a Boolean associated with it—granted or ungranted to the identity in question—to implement a "security setting" to handle the case of an identity attempting an action for which no permission has been granted, rSet is the set of resources associated with each task, for each task considered, that is, rSet=taskResources(t). This might be unused or used tasks, tasks not granted permission but attempted, etc., depending on the specifications of a given implementation; each rSet is the appropriate set of resources accessible to a given task privUsage$_{t,rSet}$=$\Sigma_{r \in Set}$f(t, r, weight$_{t,r}$, recentActionUsage$_{t,r}$), that is, it is a weighted count of how many privileged actions, by tasks per resource, the identity has used in the current accumulation period weight_t,r is the weight associated with the use by task t with a resource r recentActionUsage$_{t,r}$ represents actual actions performed by the identity, that is, tasks performed on resources, over some time window or other aggregation period, optionally with associated timestamps for each. These timestamps could then be used to compute time deltas and linear/non-linear decays as discussed above.

privilegeSystemAggregator(.) is a function that combines (for example, by summing) the numerical values, that is, counts, computed for each task/resource pair, optionally applying various appropriate weights or thresholds. To ensure consistency and that the ratio remains within the chosen bounds (such as [0, 1]) the weights applied here should be the same set weight$_{t,r}$ of weights used with privilegeUsageAggregator(.), and the same additional scaling, if any, should also be applied.

In this example, PUI is thus computed as a ratio of actions, that is, the "number of granted, unused actions" divided by the "total number of possible actions in the system". The ratio of granted, unused actions to the total number of possible actions in the system will fall in a range [0, 1], which may be scaled as desired, for example, to fall in a range [0, 100], which may be easier for customers to interpret and compare. The illustrated ratio is a specific form of U(.), where the concept of "unused" is defined with respect to a possible action, which includes both a task and a resource to which it is applied. Since resources are incorporated into the notion of actions, there is in this case no need for a separate A(.) to measure aspects of resources in the system.

In short, in this example, the system iterates over all tasks t, and for each task t, iterating over the set of all resources r that that task can access. (Note that a single task may involve access to more than one resource.) In general, it will be most informative to sum over all tasks and use a weight of zero to ignore some tasks or resources, as appropriate.

The numerator privilegeUsageAggregator will in many cases not need to include "ungranted" actions as a factor, but may be, for example, in implementations that wish to consider unsuccessful attempts to perform an action the identity has not been granted permission to perform. The denominator privilegeSysternAggregator should, however, generally factor in both granted and ungranted actions to form system-wide normalization constant.

EXAMPLE 2

In another embodiment, a POLP metric may be computed that quantifies how much an identity uses permissioned resources relative to the "universe" of resources available in the system as a whole. This ensures that the metric will return a result in a known range and thus enable consistent "scoring" and comparison over the set of identities. In other cases, it may not be necessary to consider all available resources, but rather only those for which a grant of privilege is necessary or that are in any chosen sense defined as having a higher risk factor that others.

In another example of a POLP metric, a Privilege Use Index (PUI) for a single identity is computed as:

$$PUI = privilegeRiskScore \times privilegeReachScore = P \times R \text{ where:}$$

$$P = privilegeRiskScore = \frac{numUnusedGrantedHighRiskTasks}{numTotalHighRiskTasksInAuthSystem}$$

and $$R = privilegeReachScore = \frac{numResourcesWithGrantedAccess}{numAllResourcesInAuthSystem}$$

numUnusedGrantedHighRiskTasks is a count of the number of "high risk" tasks that the identity has been granted permission for but that have not been used during an accumulation period. Note that "high risk" is only one possible criterion for choosing a specified subset of tasks to be counted in the numerator of P. Other options might be, for example, tasks that are especially computationally demanding tasks that consume relatively high network bandwidth, tasks that can delete resources; tasks that can modify permissions; tasks that can read sensitive data; etc. "High risk" may therefore more generally be interpreted to mean "highly likely to violate a privilege criterion of interest" as defined by the system designer or administrator.

numTotalHighRiskTasksInAuthSystem in this example is the number of total "high risk" tasks in the authorization system, that is, in the system (comprising one or more entities) as a whole that includes the privileged tasks any identity may carry out.

The Privilege Risk Score privilegeRiskScore thus indicates how much use an identity has made of possible granted permissions. The Privilege Risk Score will therefore, in this example, fall in the range [0, 1], but may be scaled to fall into any other desired range.

The Privilege Reach Score privilegeReachScore is an example of a form of A(.) that measures the number of access-controlled resources (numResourcesWithGrantedAccess) for which access has been granted relative to the total number of resources (both granted and ungranted) in the authorization system as a whole numAllResourcesInAuthSystem. This score will also fall in the range [0, 1], which may also be scaled as desired. Note that, in many implementations, there will be more than one identity, such that numResourcesWithGrantedAccess may be a number greater than the number granted to any single identity. The privilegeReachScore may thus be useful in cases of multi-user contention/competition for a limited resource. It is also possible, however, to compute the PUI for a given identity using values relating only to that identity alone, disregarding grants to others.

The PUI metric in this example thus not only indicates a value corresponding to how much use an identity makes of granted permissions, but also scales this value by a measurement of the fraction of all resources that the identity can access. This Example 2 approximates the ratio of actions by decomposing it into a ratio of tasks, multiplied by a ratio of resources. This is an approximation because not all tasks may be applied to all resources. Such an approximation may be useful when the cardinality of |tasks|×|resources| is extremely large.

In this example, the numerators of privilegeRiskScore and privilegeReachScore are specific to the identity(s), while the denominators are specific to the authorization system as a whole.

The PUI in this example is computed by multiplying the number of granted tasks by the number of granted resources, but all tasks typically cannot be performed on all resource types. Based on this observation, one alternative embodiment that may be more accurate does not split the computation into separate privilegeRiskScore and privilegeReachScore terms, but rather computes the metric as a single ratio, dividing the number of granted privileges for (high-risk task, resource) pairs associated with an entity by the total number of possible (high-risk task, resource) pairs in the system.

As mentioned above, actions need not be considered "binarily", but rather may optionally be classified into two or more categories (such as "sensitive" vs. "non-sensitive", "high risk" vs. "low risk", etc.) and/or assigned numerical weights that indicate a value in a range (such as "59.2" on a 100-point scale), allowing them to be weighted differently in the overall metric computation. Rather than, or in addition to, computation of the single metric, it would be possible to compute a separate, respective usage score for each of the categories. It would also be possible to divide the accumulation period into sub-periods or "buckets", with the number of uses per bucket being used to compute an identity-based metric (such as the privilegeRiskScore) based on statistical properties of the buckets, such as a weighted average.

In the above example, the PUI is computed as the product of the privilegeRiskScore and privilegeReachScore terms to yield an overall risk score metric for a given entity. Other variants may combine these inputs using more sophisticated linear or non-linear functions to yield a single numerical value (a "score" or "index" or "metric"). A different embodiment computes the value as a single ratio, dividing the number of granted privileges for high-risk task-resource pairs associated with an entity by the total number of possible high-risk task-resource pairs in the system; in other words, in such an embodiment, the metric may be computed as the cardinality of a predefined subset of "hits" (actions or attempted actions) to the cardinality of the total set of possibilities that meet one or more criteria.

Aggregate PUI

Identities may also form a group for which a use metric is to be computed. A "group" could be, for example, a set of identities in the same role usage cohort, operating within the same authorization system or organization, all identities having used a permission/role in some recent time period, such as the past 90 days, etc., in short, any defined set of identities across one or more properties. Group membership may also change over time, which may be accounted for by adjusting or restarting an accumulation period accordingly, changing the weights within PUI calculations, etc.

Embodiments may also compute an aggregate metric that summarizes the degree to which an aggregate collection of individual identities conforms to POLP, such as for an entire organization, group, or company. This may be referred to generally an "Organization Privilege Use Index" (OPUI). In general, individual per-identity risk scores are combined to yield an aggregate risk score. In some embodiments, only a subset of the individual identities are considered when generating the aggregate organization risk score, such as the N highest individual risk scores (e.g. "top 100"), or individual risk scores above a percentile threshold P (e.g., "top 25%"). Considering only a subset of individual entities can make the metric more robust, with less fluctuation as the number of entities varies over time.

Considering only a subset of individual identities may, moreover, make the metric more robust, with less fluctuation as the number of identities varies over time. This technique may also help adjust for "expectation violations" when adding/removing resources or identities to an authorization system. For example, it would go against expectation that an increasing per-identity score would decrease the org-level score. Another method that may be used when the administrator notices that a PUI metric is changing in the "wrong" direction is to apply an explicit adjustment value to compensate for and avoid the violation. This adjustment value may then be stored and reduced in accordance with future metric changes that move in the "right" (expected) direction and lead to a score that is stable, so as to gradually eliminate the need for adjustment over time.

In some embodiments, scores may themselves be used as the weights, such that the weight used when aggregating each individual risk score is the score itself. For example, a score of "50" would counts tens times more than a score of "5". In other embodiments, high individual risk scores may be weighted more heavily than low individual risk scores, such as by first applying a weighting function (linear or non-linear) to the raw individual scores before aggregating or combining them. Aggregation may be done by (possibly weighted) summation. Statistics, such as the average and/or standard deviation, of the scores may also be computed if desired.

One method for computing an aggregate OPUI is to compute a weighted average as the sum of the weighted per-identity risk over all identities in the specified subset of identities, divided by the sum of the maximum possible organization risk (org-risk) contribution for each of these identities. The per-user risk may be computed as:

$$\frac{userPUI}{maxPUI} \times weight,$$

where
  userPUI is the per-user PUI in a predetermined range, such as [minPUI, maxPUI], where minPUI could, for example, be 0 and maxPUI could, for example, be 1.0, or 100, depending on what scaling is applied
  weight is a per-user weight The maximum org-risk contribution of each identity may thus be its weight, which may in some embodiments be equal to its score, e.g. weight=userPUI. In other embodiments, the weight may be based on a risk classification such as high/medium/low (1/2/3), or on any other more granular weighting scheme.

Optionally, only a subset of identities in the organization may be considered in the aggregate PUI computation. The size and composition of the subset may be varied to yield different aggregate POLP metrics. For example, including only the highest-risk identities or identities who have been in the system the longest will generate a higher score that is focused on the "worst" or longest standing individuals in the organization, rather than including all identities. Including only a subset of identities may also produce a more robust, stable metric that doesn't fluctuate wildly when some identities join or leave the organization.

As one option, an embodiment may initially compute the OPUI by including all identities, and this count may be stored as a value such as numUsersConsideredInRiskCalc. This value may then be used until the total number of identities in the organization changes by more than a specified threshold. As one example, numUsersConsideredIn-RiskCalc may be updated each time the total number of identities increases by some percentage, such as 20%. If the total number of identities drops below numUsersConsideredInRiskCalc, the values for the "missing" identities may be set to zero, since a deleted identity no longer represents any risk. One extension would be to add a threshold to update numUsersConsideredInRiskCalc each time the total number of identities drops by some number or percentage. Yet another option would be to use an aging technique, such as an exponentially-weighted moving average (EWMA).

Aggregate metrics may be compared, for example, across different organizations, which may allow administrators to understand how well their organization is conforming to a POLP relative to a peer group consisting of other organizations. A peer group may optionally be defined based on some shared characteristics, such as the size, industry, or geographic location of each organization. In addition, a separate score may be computed for each individual entity and each aggregation with respect to every instance of an organization's authorization systems, such as Amazon AWS, Microsoft Azure, VMware vSphere, etc. These could then be combined to form a single metric spanning multiple authorization systems, such as by using a weighted average, where the weights may be based on the relative size or importance of the different authorization systems.

Failed Valid Attempts

In systems with many identities contending for access to permissioned resources, it may happen—sometimes often—that an identity attempts an action for which it has permission, but this request cannot be fulfilled because of unavailability of the needed resource(s). One way to view such cases is to count the attempt itself as a "use" for the purpose of computing the PUI. The system might then also adjust the value privilegeReachScore as a function of how often requests had to be denied during the accumulation period.

Improving PUI Accuracy

In the second embodiment described above, PUI is computed as PUI=privilegeRiskScore×privilegeReachScore=P×R, which allows for efficient computation. This expression does not explicitly assume, and the embodiment does not require, independence of the two factors, and this method of computing PUI does not clearly take into account possible dependence. It is generally reasonable to assume at least some dependence between P and R, however, since each task cannot be applied to every resource type. To improve accuracy, other embodiments therefore capture the fraction of valid (task, resource) pairs to which the identity has been granted access but has not been using.

These more accurate embodiments thus compute the sizes of the total set of all valid task/resource pairs T, and the set of unused task/resource pairs U for which the identity has been granted privileges. More formally, let:
T={$(t_i, r_i)$|task $t_i$ can be performed on resource $r_i$}
U={$(t_i, r_i)$|identity has an unused granted privilege to perform task $t_i$ on resource $r_i$}
PUI may then be computed as PUI=|U|/|T|, where |.| indicates cardinality. Note that since U⊆T, PUI will be a value in [0,1].

In other words, the PUI value in this embodiment is the number of unused granted privileges for (task, resource) pairs, divided by the total number of valid (task, resource) pairs in the environment.

Consider also the set of all pairs G for which an identity has been granted privileges, and its subset A containing granted privileges that were actively used over an accumulation period, such as the past n hours, days, weeks, etc. Thus:
G={$(t_i, r_i)$|identity has been granted privilege to perform task $t_i$ on resource $r_i$}
A={$(t_i, r_i)$|identity has used a granted privilege to perform task $t_i$ on resource $r_i$}
G=A∪U⇒U⊆G⊆T and A⊆G⊆T The sets of (task, resource) pairs will typically be much larger than the total number of possible tasks and the total number of resources, which may greatly increase the computational burden for efficient processing. For a given typical environment, however, |T| will be a constant at any point in time, such that it need be recomputed only when the environment changes, for example, when resources are added or removed. Moreover, in practice, most identities perform a limited number of tasks on a limited number of resources, such that embodiments may track the (task, resource) pairs that are used with reasonable efficiency. Since the number of granted (task, resource) pairs is constant at any point in time, it need be recomputed only in response to changes to the environment or modifications of identity permissions. Yet another method for reducing the computational burden in cases in which there is a very large number of (task, resource) pairs would be to reduce the set to be examined by applying approximation techniques such as employing Bloom filters or hashing.

Single-factor, per-task weights are described above, as well as dual-factor weights for (task, resource) pairs. It would also be possible to increase weighting granularity even further, for example, by assigning weights per-(task, resource, identity) triples, for example, to take into account qualitative factors relating to different identities.

Custom Weights

Although an option, it is not necessary to consider all tasks and resources as being equally important in the computation of a PU/value. Furthermore, in some implementations customers may wish to have the ability to specify that some tasks and/or resources are more important than others.

Interaction Weights

Implementing only separate per-task and/or per-resource weights suffers from a problem similar to the invalid independence assumption discussed above. As one example, the AWS GetObject task may be assigned a low weight based on its normal usage, but when applied to particular resources, such as sensitive S3 buckets, it should in most cases instead be assigned a high weight. In other words, having a finer granularity for weights may often provide better accuracy. In some embodiments custom weights are therefore specified for individual (task, resource) pairs; these weights are referred to here as interaction weights (or simply "action weights"). Returning to the example, in these embodiments, the system may specify an interaction-specific weight for (Getobject, sensitive_S3_bucket). Support for interaction weights requires the corresponding use of (task, resource) pairs in the PUI formula, as explained further below.

Interaction Classes

In some situations, customers may be given the option to manually specify weights for their respective anticipated individual (task, resource) pairs. In many cases, however, this may be too burdensome, given the large number of pairs that will often be involved. Some embodiments instead determine meaningful weights by leveraging grouping mechanisms, while still allowing optional overrides for specific interactions.

Service-Level Weights

One coarse-grained way to group sets of interactions is by service, such as S3 or EC2. A custom service-level weight may then be applied to all (task, resource) pairs associated with that service.

Class-Based Weights for Actions and Resources

Grouping tasks, resources, and (task, resource) pairs into classes offers various advantages. For example, tags may be used to mark specific S3 buckets containing confidential information as sensitive resources, or specific EC2 instances as production resources. Cloud Configuration Management Database (CMDB) tags are one example of tags that may be used. Similarly, task class names may also be assigned to specific sets of tasks, such as read-only or destructive. Tagging may also be used for classes of (task, resource) pairs, which could be specified in various ways.

Weighting Rules

In all but the simplest, static situations, it will usually be preferable to be able to adjust weights according to a policy, that is, according to rules. Rules may be established per-identity, per-resource, or according to any other chosen policy. Rules may also be applied per-class. The following are a few illustrative examples of class-based weight rules, expressed with the syntax (task-class, resource-class)⇒weight (symbolic weights are discussed below) and where "*" is a wildcard character that, in this example, matches all tasks (when used for the task-class parameter) and all resources (when used for the resource-class parameter).

Sensitive resources should generally count more: (*, sensitive)⇒high

Read-only tasks should generally count less: (read-only, *)⇒low

Weight sensitive GetObject heavily: (GetObject, sensitive)⇒very-high

Custom weight for pair of classes: (destructive, production)⇒very-high

In some embodiments, there may be different rule sets, and in some cases more than one rule might be applicable even in the same situation. Some mechanism should then be included to choose which to apply. One example of such a policy can be termed "first match", in which the rules are ordered, for example by the administrator, and only the first one that matches the corresponding situation is applied.

As another example, the weight for a specific interaction may be defined by the most-specific matching rule, which makes it easy to compactly express coarse rules that apply broadly, while still allowing for more specific overrides. According to this policy, coarse, that is, more general, rules are applied broadly, and finer rules apply more narrowly. This allows coarse rules that apply broadly to be expressed compactly, and only exceptions or special cases need to be defined with more narrow/specific rules. Using the example above, GetObject is in the "read-only" class, so the coarse rule "(read-only, *)"⇒low would mean that, without any more specific matching rule, GetObject on any resource would get a "low" weight. By defining the narrower rule "(GetObject, sensitive)⇒very-high", however, a GetObject on a sensitive resource will override the coarse rule and get a "very-high" weight, because it matches the more specific rule applied to the sensitive resource-class. This approach effectively avoids most of the problems associated with coarse rules that are mentioned above, and also allows for flexible and fine-grained customization, such as a rule covering only a single task type applied to a single particular resource. Note also that with the explicit rule ordering described in the previous paragraph, one could achieve essentially the same effect by ordering the more-specific rules earlier, and the broader rules later.

Symbolic Weights

Weights may be defined in any convenient manner to have any chosen level of granularity and to fall within designed ranges. One choice is for the weights to be symbolic, such as low, medium, and high, which will in general be easier for customers to select from. The symbolic weights will then be mapped automatically to appropriate corresponding numerical values, such as, for example, low=0.5, medium=1, and high=2. Symbolic names will generally be more readable, and provide a level of indirection that enables changing its value everywhere by simply updating a single definition. Moreover, symbolic weights will usually be easier for customers to learn to use, with less likelihood of mistake. One other option would be to allow customers to choose their own names for weights, which may then be mapped to appropriate corresponding numerical values.

It would, of course, also be possible to enable customers, administrators, or others to choose weights in a numerical range with any desired degree of precision, with possible automatic scaling after selection to ensure that the actual weight value falls within a chosen range.

Whether presented symbolically or numerically, it is preferable to include the option of setting a weight's value to zero, for example, ignore=0. Other default weights may also be implemented; as one example, the default weight for non-high-risk task types could be something like (NonHighRiskTask,*)⇒ignore.

Simulation-Tested Weighting

Custom weights may have large effects on individual PUI scores, which in turn will affect organization-level (org-level) PUI scores. It may therefore be helpful to enable customers to better understand the impact of their custom weight rules.

As a first step, besides custom-weighted PUI scores, the system preferably additionally calculates unweighted PUI scores—and makes them available for comparison and analysis via a user interface (UI) available to entities such as the relevant customer, an administrator or analyst, etc. Customers may then compare their chosen customized weighted PUI scores with the default unweighted baseline version. This may help them see the effect of their rules and, if desired, prompt them to adjust their custom weights accordingly.

This procedure may be extended to enable customers to iteratively test weighting choices using actual data. First, the system may capture and store actual resource usage data during an accumulation period and compute the corresponding PUI score using whichever method is chosen. The associated customer (for example), may then be enabled, via the customer's UI, to adjust any or all of the weights, change, add or delete rules, etc. As each weight or rule is changed, or at the end of a series of changes as indicated by the customer, the administrator may then recompute a new PUI score (either per-identity, or org-level, or both) from the stored resource usage data, which it may then pass to the customer for display and evaluation. The customer may then be given the option to commit changes based on the results of the "simulations", that is, "test runs", and the administrator may then apply the committed values and rules to the immediate usage data set, or retroactively (if relevant usage data has been stored), or during subsequent accumulation periods, or any combination of these.

Custom Org-Level PUI Scores

Class-based grouping may also be applied to generate custom org-level PUI scores, by defining identity classes with custom weights. The ability to specify weights also subsumes features for completely excluding some classes of identities from a custom score, by simply giving them a weight of zero. Examples include computing separate PUI scores for bots and humans, providing a separate score for AWS Lambda functions, etc. As with custom individual PUI weights, it will be advantageous to also compute the existing unweighted org-level score, and make it available via the appropriate UI.

Custom Definitions of "Unused"

The notion of an "unused permission" may differ from identity to identity, and from situation to situation. For example, for computing a PUI, some identities may wish to accumulate data over a longer period than other entities. Embodiments may therefore provide an option for identities or groups of identities to specify their desired accumulation periods, either in general, or with different time periods for different classes of tasks, resources, or interactions.

It is also possible to generalize the simple Boolean "never used" check to instead compute a real-valued function of the time since last use. For example, this would permit counting a permission that hasn't been used in, for example, 89 days, almost as much as one that hasn't been used for a full 90 days, and/or counting a permission that hasn't been used in, for example, 180 days, more heavily than one that hasn't been used for only 90, or many other behaviors, such as weighting functions that grow or decay non-linearly. The system may also compile and numerically or graphically display per-permission information showing the time of or since most recent use, optionally with color-coding to more readily identify relatively long-unused permissions.

Implementations may also generalize the definition of "unused" to use a different threshold than zero, such as "at most n uses", or to use alternative metrics based on relative usage compared to other identities with similar permissions.

Tracking Pair-Level Usage

Although embodiments may track and measure privilege use for any realistic number of actions, it is generally reasonable to assume that most users typically will perform only a limited number of tasks on a limited number of resources. Test evaluations of actual identity behavior over a 90-day accumulation period with a representative set of resources have validated this optional assumption. This suggests that |A|—the number of granted privileges that were actively used over such a 90-day period—will typically be small enough that it will be reasonable to track the time-since-last-use for each (task, resource) pair, without resorting to approximations. Embodiments may therefore compute |U| for each identity as |G|−|A|; in other words, the number of unused granted actions may be assumed to be equal to the total number of granted actions minus the number that have been used.

In some implementations, compiling time-since-last-use data for each possible action over a chosen accumulation period as long as, say, 90 days, might require a full scan of all actions performed over those 90 days. One way to reduce this computational burden would be to execute such a scan with shorter intervals, for example, once per day, and to update results incrementally, possibly on an even shorter schedule, such as using additional task data only from the past hour.

Note that if weights are not included, such that only unweighted pair-level identity PUI scores are needed, then the system could issue appropriate database queries to simply count the number of distinct (task, resource) pairs used by each identity over a time period.

Tracking Pair-Level Permissions

In addition to tracking pair-level usage of granted permissions—to compute |U|—pair-based scoring also requires counting the total number of valid (task, resource) pairs in an environment—to compute |T|. As noted earlier, |T| need only be recomputed when the environment changes, such as when resources are added or removed. Significantly, |T| doesn't differ across identities, since it doesn't depend on the number of granted (task, resource) pairs for individual identities. However, to compute |U|=|G|−|A| for each individual identity, it will be necessary to compute the number of granted pairs |G|. One way to obtain this information and compute per-identity granted values would be to extract the data about derived permissions and resources that may be stored in any known database system, just one example of which, used in a prototype, is the known cross-platform document-oriented database program MongoDB.

Presentation

In some embodiments, humans, such as system administrators, will wish to be able to interpret and review the computed metrics.

One simple presentation might be for a single identity, over a single aggregation period. In such as case, the PUI for the identity could simply be reported in numerical form, or in graphical form indicating either the numerical value or a position on any conventional form of scale. In implementations that store historical usage information, the current value could be presented along with past values, in tabular, numerical form, in the form of a time- or run-dependent graph, etc.

As another alternative, the PUI for an identity could be calculated both with and without weighting, with both being displayed for comparison.

PUI values for groups may similarly be presented/displayed per-identity, along with aggregate values, also in any numerical or graphical form.

In Example 2 above, the values privilegeRiskScore and privilegeReachScore are combined by multiplication (one option) to form a single-value PUI. In some cases, administrators may wish to evaluate each term independently, especially in cases in which the system-wide resources may change relatively rapidly, or multiple systems with different numbers of resources are to be evaluated simultaneously. In these cases, it would also be possible to generate a two-dimensional display for the administrator, for example, with each term defining one axis, with an identifier for the identity as the plotted "point". One single-value measure of the two terms could be a ratio, as described above, but might also be the Euclidean, Manhattan, or other distance from the origin to the point for each identity.

Collection

A software module is preferably included within each system for which usage data is to be monitored to gather usage data. In some cases, the modules may be identical, with one designated as a "central" module that collects data from the others and performs the PUI computations and reporting of result; in other cases, all but the central module could be software modules that simply collect and communicate data to the central module. The usage data itself may be collected in any known manner, such as by examining cloud provider logs (for example, Amazon Cloud Trail), system logs (for example, syslog) of the respective computer systems, or by receiving information from other system software.

Processing

The various methods for computing a PUI or OPUI described above provide usage-related metrics that may themselves be used for different purposes. One purpose may be simply informative, serving to guide administrators toward high-value policy changes. Moreover, reporting metrics for multiple organizations may provide a useful benchmark that allows administrators to assess the effectiveness of their security policies relative to peers.

Policy changes may also be automated, as a result of rules included along with the PUI routines. For example, if an identity fails to use granted permissions often enough relative to a pre-set value, then the system might automatically revoke those permissions, or flag the administrator, who may then choose to revoke them or take some other measure to improve adherence to the chosen POLP policy.

FIG. 1 illustrates the main hardware and software components of one example of a computing system that may be used to implement embodiments of the invention. The highest-level entities—resources 100, identity/-ies 200-1, . . . , 200-k, the administrator 300 and at least one customer 400 have already been mentioned.

The platforms on which entities such as the administrator 300 run will include standard components such as system hardware 310 with at least one processor 311, volatile and/or non-volatile memory and/or storage, indicated "collectively" as component 312, and standard I/O access components 314 to enable communication with other entities and systems over any known type of network, wireless or wired. The processor-executable code organized as software modules used to carry out the various computations and functions described above may be stored and thus embodied in either or both types of memory/storage components 312. The software modules will thus comprise processor-executable code that, when run by the processor(s) 311, cause the processor(s) to carry out the corresponding functions. Some form of system software 320 will also be included, such as an operating system 321 and/or virtual machine hypervisor.

Platforms will also include an application layer 330, which comprises various software components/modules for performing the functions described above, for example, depending on the entity, accessing resources according to permissions, collecting information concerning such accesses, computing one or more PUI values (such as both weighted and unweighted PUI values), adjusting weights, etc. Accordingly, in FIG. 1, a software module 310 within the administrator is shown as being responsible for detecting accesses by identities to resources, computing PUI value(s), as well as a component 320 that may assign privileges to identities and adjust these privileges according to PUI values. The customer 400 is shown as having a user interface 410, with standard facilities to enable weight selection 412 and display 414 of results.

Although some entities may run on a single hardware/software platform, such as is shown in FIG. 1 for the administrator 300, this is not a requirement, even for the administrator; rather, some entities, in particular, but not limited to identities, may operate using hardware and software resources that reside and run on more than one, different physical and/or virtual platform.

In FIG. 1, both the computation of PUI values and assignment and adjustment of privileges are shown as being performed by the administrator 300, which thus acts as the overall system's conformance-evaluating entity. This is just one configuration option. As an alternative, an additional entity (not shown) may be included, which inputs the data indicating resource accesses by any identity of interest, and performs the PUI calculations. These PUI calculations may then be passed to either a customer, or to the administrator, or both, which may then adjust privileges according to any chosen criteria.

The invention claimed is:

1. A method for adjusting access privileges of an identity to resources within an authorization system of a computing environment, comprising:
granting the identity access privileges to access one or more permissioned resources of the resources;
over a detection period, detecting accesses by the identity to the one or more permissioned resources;
computing a usage score as a usage function of:
a first ratio of a first measure and a second measure, the first measure a measure of use by the identity of its granted access privileges and the second measure a measure of a set of possible privileges, and
a third measure of a number of the permissioned resources; and
adjusting the set of access privileges granted to the identity based at least on the usage score and a least privilege security policy.

2. The method of claim 1, further comprising computing the third measure as a second ratio of the number of permissioned resources and a total number of resources in the authorization system.

3. The method of claim 1, in which the first measure is a count.

4. The method of claim 1, in which the first measure is a function of a measure of time.

5. The method of claim 1, further comprising computing the first measure as a weighted sum of a measure of recency of actions by the identity, each said action corresponding to a task applied by the identity to at least one of the resources.

6. The method of claim 1, wherein:
the first measure comprises a count of granted, unused actions by the identity;
the second measure comprises a count of a total number of possible actions in the computing environment, each possible action of the possible actions corresponds to a task applicable to at least one permissioned resource of the permissioned resources; and
said computing the usage score as the usage function comprises computing the first ratio by iterating over all tasks that correspond to the possible actions, and, for each task, iterating over the set of all resources that said task can access.

7. The method of claim 1, wherein:
the method further comprises:
computing the first ratio as a privilege risk score, wherein:
the first measure comprises a numeration of a specified subset of tasks that the identity has been granted permission for but that the identity has not used during the detection period, and
the second measure comprises a numeration of all of the specified subset of tasks in the computing environment that the identity may carry out; and
computing the third measure as a privilege reach score, the privilege reach score a second ratio of a numeration of the permissioned resources and a numeration of all resources in the authorization system; and
computing the usage score as a function of the product of the privilege risk score and the privilege reach score.

8. The method of claim 7, in which the specified subset of tasks are high risk tasks.

9. The method of claim 1, further comprising:
defining a group of a plurality of identities comprising the identity;
computing a respective usage score for each of the plurality of identities; and
computing an aggregate usage score as a function of the respective usage scores.

10. The method of claim 9, further comprising computing the aggregate usage score as a second ratio of a weighted sum of the respective usage scores for each of the plurality of identities and a sum of a maximum possible organization risk value of each of the plurality of identities.

11. The method of claim 9, further comprising:
   detecting a change in value of the respective usage score of one of the plurality of identities is inconsistent with a corresponding expected change in the aggregate usage score; and
   applying a compensating adjustment value to the aggregate usage score.

12. The method of claim 1, wherein:
   the second measure comprises a sum of a total set of all valid (task, resource) pairs; and
   the first measure comprises a sum of a set of unused (task, resource) pairs for which the identity has been granted privileges.

13. The method of claim 12, further comprising applying weights to a set of granted (task, resource) pairs for which the identity has been granted privileges before computing the sum of the set of all valid (task, resource) pairs.

14. The method of claim 13, further comprising:
   selecting a pair of the set of granted (task, resource) pairs;
   ordering a plurality of weighting rules for the selected pair; and
   before computing the function of the sum of the total set of all valid (task, resource) pairs, applying a weight corresponding to the weighting rule that is first in order that matches the selected pair.

15. The method of claim 13, further comprising grouping at least one of tasks, resources, and (task, resource) pairs into classes.

16. The method of claim 15, further comprising defining class-pair weights for (task class, resource class) pairs.

17. The method of claim 13, further comprising:
   selecting a pair of the set of granted (task, resource) pairs;
   evaluating a level of specificity of the selected pair; and
   before computing the function of the sum of the total set of all valid (task, resource) pairs, applying a weight corresponding to a weighting rule that most specifically matches the level of specificity of the selected pair.

18. The method of claim 13, further comprising:
   over the detection period, compiling access information of the accesses by the identity to the permissioned resources;
   adjusting the weights; and
   computing the usage score using the adjusted weights.

19. The method of claim 18, further comprising computing the usage score over at least one subsequent detection period using the adjusted weights.

20. The method of claim 18, further comprising iteratively adjusting the weights and recomputing the usage score based on the compiled access information.

21. The method of claim 1, further comprising displaying a representation of the usage score to a customer.

22. A system for adjusting access privileges of an identity to resources within an authorization system of a computing environment, comprising:
   a conformance-evaluating entity that comprises:
      a processor; and
      a usage score component comprising computer-executable code that, upon execution by the processor, causes the conformance-evaluating entity to:
         over a detection period, detect accesses by the identity to one or more permissioned resources of the resources;
         compute a usage score as a usage function of:
            a first ratio of a first measure and a second measure, the first measure a measure of use by the identity of its granted access privileges and the second measure a measure of a set of possible privileges, and
            a third measure of a number of the permissioned resources; and
         adjust the set of access privileges granted to the identity based at least on the usage score and a least privilege security policy.

23. The system of claim 22, wherein the computer-executable code, upon execution by the processor, further causes the conformance-evaluating entity to:
   compute the third measure as a second ratio of the number of permissioned resources and a total number of resources in the authorization system.

24. The system of claim 22, wherein:
   the first measure comprises a count of granted, unused actions by the identity;
   the second measure comprises a count of a total number of possible actions in the computing environment, each possible action of the possible actions corresponds to a task applicable to at least one permissioned resource of the permissioned resources; and
   the computer-executable code, upon execution by the processor, further causes the conformance-evaluating entity to compute the first ratio by:
      iterating over all tasks that correspond to the possible actions, and, for each task, iterating over the set of all resources that said task can access.

25. The system of claim 22, wherein the computer-executable code, upon execution by the processor, further causes the conformance-evaluating entity to compute the usage score by:
   computing the first ratio as a privilege risk score, wherein:
      the first measure comprises a numeration of a specified subset of tasks that the identity has been granted permission for but that the identity has not used during the detection period, and
      the second measure comprises a numeration of all of the specified subset of tasks in the computing environment that the identity may carry out;
   computing the third measure as a privilege reach score, the privilege reach score a ratio of a numeration of the permissioned resources and a numeration of all resources in the authorization system; and
   computing the usage score as a function of the product of the privilege risk score and the privilege reach score.

26. The system of claim 22, wherein the computer-executable code, upon execution by the processor, further causes the conformance-evaluating entity to:
   compute a respective usage score for each of a plurality of identities in a group, the plurality of identities comprising the identity; and
   compute an aggregate usage score for the group as a function of the respective usage scores.

27. The system of claim 22, wherein:
   the second measure comprises a sum of a total set of all valid (task, resource) pairs; and
   the first measure comprises a sum of a set of unused (task, resource) pairs for which the identity has been granted privileges.

28. The system of claim 27, wherein the computer-executable code, upon execution by the processor, further causes the conformance-evaluating entity to apply weights to a set of granted (task, resource) pairs for which the identity has been granted privileges before computing the sum of said set of (task, resource) pairs.

29. The system of claim 28, wherein the computer-executable code, upon execution by the processor, further causes the conformance-evaluating entity to
- over the detection period, to compile access information of the accesses by the identity to the permissioned resources;
- to apply adjustments to the weights; and
- to compute the usage score using the adjusted weights.

30. The system of claim 29, wherein the computer-executable code, upon execution by the processor, further causes the conformance-evaluating entity to iteratively:
- send a currently computed usage score for display to a customer;
- input from the customer adjusted weights; and
- recompute the usage score based on the adjusted weights.

31. The method of claim 1, wherein the measure of a set of possible privileges comprises at least one of:
- access privileges granted to the identity; and
- access privileges grantable to the identity.

32. The system of claim 1, wherein the measure of a set of possible privileges comprises at least one of:
- access privileges granted to the identity; and
- access privileges grantable to the identity.

\* \* \* \* \*